(12) United States Patent
Daly et al.

(10) Patent No.: US 6,807,168 B2
(45) Date of Patent: *Oct. 19, 2004

(54) METHOD AND SYSTEM FOR PROVIDING DATA COMMUNICATION WITH A MOBILE STATION

(75) Inventors: Brian Kevin Daly, Redmond, WA (US); David William James Holmes, Redmond, WA (US); Michael Luna, Bothell, WA (US); Michael P. Moore, San Diego, CA (US); John Eric Myhre, Shoreline, WA (US); Adrian David Smith, Kirkland, WA (US)

(73) Assignee: AT&T Wireless Services, Inc., Kirkland, WA (US)

(*) Notice: Subject to any disclaimer, the term of this patent is extended or adjusted under 35 U.S.C. 154(b) by 154 days.

This patent is subject to a terminal disclaimer.

(21) Appl. No.: 10/120,548

(22) Filed: Apr. 12, 2002

(65) Prior Publication Data

US 2002/0159476 A1 Oct. 31, 2002

Related U.S. Application Data

(63) Continuation of application No. 08/868,350, filed on Jun. 3, 1997, now Pat. No. 6,393,014.

(51) Int. Cl.[7] .............................................. H04L 12/66
(52) U.S. Cl. ........................ 370/352; 370/401; 370/329; 370/466
(58) Field of Search ................................ 455/426, 556; 370/352–356, 400, 401, 328, 329, 466, 467, 349

(56) References Cited

U.S. PATENT DOCUMENTS

| | | | |
|---|---|---|---|
| 4,837,798 A | | 6/1989 | Cohen et al. |
| 4,887,265 A | * | 12/1989 | Felix ........................... 370/333 |
| 4,916,691 A | * | 4/1990 | Goodman .................... 370/389 |
| 4,965,821 A | | 10/1990 | Bishop et al. |
| 5,131,020 A | | 7/1992 | Liebesny et al. |
| 5,159,592 A | | 10/1992 | Perkins |
| 5,206,901 A | | 4/1993 | Harlow et al. |
| 5,214,689 A | | 5/1993 | O'Sullivan |
| 5,254,986 A | | 10/1993 | DeLuca |
| 5,325,362 A | | 6/1994 | Aziz |
| 5,410,543 A | | 4/1995 | Seitz et al. |
| 5,533,026 A | | 7/1996 | Ahmadi et al. |
| 5,590,133 A | * | 12/1996 | Billstrom et al. ............ 370/349 |
| H1641 H | * | 4/1997 | Sharman ...................... 370/538 |
| 5,732,216 A | * | 3/1998 | Logan et al. ................ 709/203 |
| 5,742,905 A | | 4/1998 | Pepe et al. |

(List continued on next page.)

FOREIGN PATENT DOCUMENTS

| | | |
|---|---|---|
| EP | 0 797 342 A | 9/1997 |
| WO | WO 96/21984 | 7/1996 |
| WO | WO 97/08906 | 3/1997 |
| WO | WO 97/13382 | 4/1997 |
| WO | WO 98/11744 | 3/1998 |

OTHER PUBLICATIONS

Melanchuk, Dupont, Backer, "CDPD and Emerging Digital Cellular System", COMPON, pp. 2–8, Dec. 1996.*
Perkins, Charles E., "Mobile IP", *IEEE Communications Magazine*, IEEE Service Center, vol. 35, No. 5, May 1, 1997, Piscataway, New Jersey.
European Search Report, Jun. 6, 2000.

*Primary Examiner*—John Pezzlo
(74) *Attorney, Agent, or Firm*—Kenyon & Kenyon

(57) ABSTRACT

A teleservice server in a wireless network provides an interface between a mobile station and an Internet protocol network thereby facilitating data transfers between these elements. The server translates datagrams from the IP network into a format suitable for transmission over a wireless network that provides voice communication capabilities. The server also translates data messages received from the mobile station over the wireless network into a format suitable for appropriate transmission in the IP network.

8 Claims, 5 Drawing Sheets

U.S. PATENT DOCUMENTS

| | | | |
|---|---|---|---|
| 5,784,362 A | * 7/1998 | Turina | 370/321 |
| 5,797,099 A | 8/1998 | Ejzak et al. | |
| 5,805,997 A | * 9/1998 | Farris | 455/461 |
| 5,819,178 A | 10/1998 | Cropper | |
| 5,819,184 A | 10/1998 | Cashman | |
| 5,822,694 A | 10/1998 | Coombes et al. | |
| 5,839,076 A | 11/1998 | Becher | |
| 5,845,215 A | * 12/1998 | Henry et al. | 455/553 |
| 5,896,369 A | 4/1999 | Warsta et al. | |
| 5,920,821 A | * 7/1999 | Seazholtz et al. | 455/466 |
| 5,978,679 A | * 11/1999 | Agre | 455/442 |
| 6,021,433 A | * 2/2000 | Payne et al. | 709/219 |
| 6,044,267 A | 3/2000 | Foladare et al. | |
| 6,094,578 A | 7/2000 | Purcell et al. | |
| 6,157,836 A | * 12/2000 | Cashman | 455/436 |
| 6,195,564 B1 | * 2/2001 | Rydbeck et al. | 455/557 |
| 6,418,324 B1 | * 7/2002 | Doviak et al. | 455/556 |

\* cited by examiner

METHOD AND SYSTEM FOR PROVIDING DATA COMMUNICATION WITH A MOBILE STATION

This application is a continuation of U.S. patent application Ser. No. 08/868,350, filed Jun. 3, 1997 now U.S. Pat. No. 6,393,014, entitled "Method and System for Providing Data Communication With A Mobile Station," and incorporated herein by reference in its entirety.

BACKGROUND OF THE INVENTION

The present invention is directed to a method and system for providing communication with a mobile station. More particularly, the present invention is directed to a method and system for transferring data from an Internet Protocol (IP) network to a mobile station on a non-IP network.

The demand for data communication capabilities continues to grow. Individuals seek more and more ways to access available data or to transmit data. An example of the continued growth of this industry is the explosion in communications over the Internet and in particular, the World Wide Web. Communications over this medium take place in what is commonly referred to as the HyperText Transfer Protocol (HTTP) or Internet Protocol (IP). An example of data communication configurations which allow a user to interact with the Internet are shown in FIGS. 1A and B.

In FIG. 1A a user at, for example computer terminal, such as a PC 10, is connected via a modem 11 to a public switch telephone network (PSTN) 15. Somewhere in that PSTN resides an access provider 20. The access provider provides a datalink 25 to the Internet, here shown as HTTP NETWORK 30. Typically, software referred to as a "browser" is loaded on the computer 10 and permits data communication with other data sources located in the Network 30, an example of which is the Internet. Examples of such browsers include Netscape's Navigator and Microsoft's Internet Explorer. The computer 10 and the data resources in Network 30 communicate in an open language referred to as the hypertext mark-up language (HTML). While this configuration is very useful to the user, it has some limitations in that to be able to access information from the Internet the user must have a computer, such as a PC or laptop, for example, with them to be able to communicate with the Internet. Furthermore, it requires a wired connection to the PSTN to provide access to the Internet. This somewhat limits a user's ability to access the Internet.

FIG. 1B represents one proposed attempt at providing a wireless connection from a user to the Internet. In this circumstance the user has a wireless communication device 100 that communicates over the air with a base station 110. The base station is part of a wireless data network referred to as the cellular digital packet data (CDPD) network 120. A special server 130 acts as an interface between the HTTP Network 140 and the CDPD network. An example of the communication device 100 is the AT&T PocketNet phone. In the PocketNet configuration the phone transmits information via a wireless IP network, the CDPD. The server 130 includes a software platform created by Unwired Planet. The software platform uses an open language called the hand-held device mark-up language, or HDML, to interactively display information on a hand-held device such as the PocketNet phone. The PocketNet phone browser and server applications support HDML. To access information or transmit a message, the user manipulates the phone browser's menu-based user interface with the phone keypad. Requests for information are routed through the wireless IP network and the wire line Internet to be processed at the server on which the application resides. The browser then displays the results of the query. There is, however, one limitation in the PocketNet application, namely that the phone can only receive data or interact with the Internet when the phone is in a data-only mode since communications over the CDPD are strictly data communications. The PocketNet configuration does not permit interaction with the data network or receipt of data while in a voice mode or in an idle mode.

It would be advantageous if a network could provide data communications to a hand-held device whereby the communications could take place while the device is either in an idle mode or in a voice mode.

Another wireless communications protocol known as IS-136, TIA/EIA/IS-136.1-A October 1996; TIA/EIA/IS-136.2 October 1990, herein incorporated by reference, provides a cellular phone with the capability of receiving short messages while in an idle mode or in a voice mode. However, messages are generated by a message center which provides appropriately formatted data to comply with the IS-136 protocol. The hand-held device does not communicate with an Internet data communication network.

SUMMARY OF THE INVENTION

The present invention provides a method and system which enhances a user's capability of communicating with an Internet-like network using a hand-held device. More specifically, the present invention permits the user to communicate with a data network while either in an idle mode or while in a voice mode.

In one embodiment of the present invention, a request to transfer data from an IP network to the mobile station is received; then it is determined whether the mobile station is registered in a first network. If the mobile station is so registered then the data is adapted to be transferred for transport via a teleservice provided in the first network and then the adapted data is transferred to the mobile station.

In one, more particular, embodiment of the present invention the mobile station is registered on an IS-136 network. The IP network informs a server of a desire to transfer a datagram to the mobile station. If the mobile station is registered in the network then the datagram is translated into an R-Data message in the IS-136 protocol and the R-Data message is transferred to the mobile station.

In a further embodiment of the present invention the mobile station may generate a request and that request for data will be translated into an appropriate format suitable for the IP network. In response to this request the IP network will send data back and the data will be translated into a format consistent with the teleservice network to which the mobile station is connected.

In a still further embodiment the request from the mobile station constitutes an R-Data message to a teleservices server and the data request is translated to a format suitable for the IP network. The IP network then sends a datagram in response to the request and the teleservices server translates the datagram to an R-Data message in the IS-136 protocol. The R-Data message is then transferred to the mobile station.

The transfer of data between the mobile station and the IP network can take place while in the idle mode or in the voice mode.

DETAILED DESCRIPTION

Figure 2:
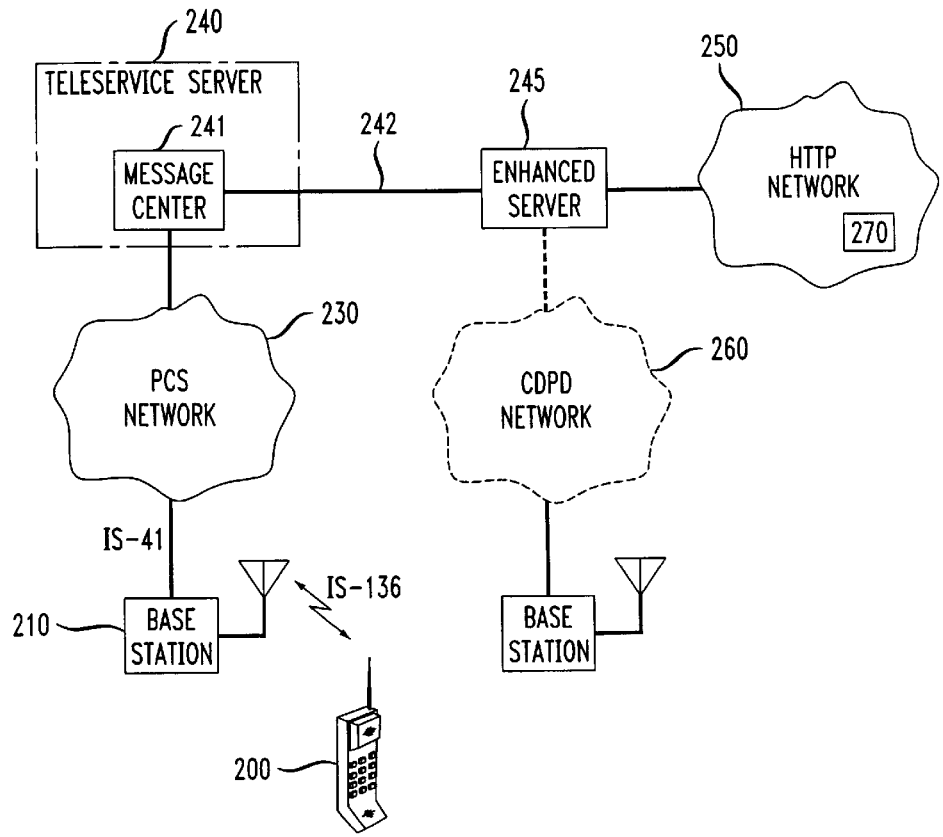
FIG. 2 illustrates a block diagram representation of a data communication configuration in accordance with an embodiment of the present invention.

In accordance with an embodiment of the present invention a mobile station can receive communications from or communicate data requests to an Internet protocol network while in an idle or a voice mode. A block diagram representation of an embodiment of the present invention is illustrated in FIG. 2.

In this embodiment a user has a mobile station 200, shown here as a hand held device, which may be a cellular phone which is capable of operating under the IS-136 protocol. The cellular phone has wireless communications with a base station 210 using that protocol. The base station is part of a wireless network which may be the PCS (Personal Communications Services) network or any other wireless network. The base station communicates with the network over a protocol referred to as IS-41. Such a PCS network exists and is already known. The IP network, here shown as cloud 250 labeled HTTP Network (referring to Hypertext Transfer Protocol) can communicate with a handheld or mobile station on PCS network 230 via its coupling to an Enhanced Server 245 which is in turn coupled to a Teleservice Server 240. The Enhanced Server can identify a request from the HTTP Network for a transfer of data to a hand held device. The Enhanced Server then signals the Teleservice Server via communication line 242. A message center 241, which may constitute a part of the Teleservice Server 240, can receive the data from the Enhanced Server 245. The message center then translates the data into a format for relaying the data to the handheld device in accordance with the status of the mobile station. In particular, if the mobile station is registered with a Teleservice Server but in an idle mode then the message center can transfer data via the PCS network and base station 210 to the mobile station 200, the data being properly formatted in the IS-136 protocol. A web browser which operates in an open language (e.g., HDML hand held device mark-up language), allows for the display of information on the mobile station. If the mobile station is idle this information is transferred over a digital control channel (DCCH). Alternatively, if the hand held device is already in the voice mode, then the hand held device is operating on a voice channel but the messages can be properly formatted so as to be interleaved with the voice communications on the digital traffic channel and thus permit a transfer of data to the mobile unit. Again, at that stage the browser language will control how the transferred data is displayed on the mobile station.

At this point data transfers from the IP network to the mobile station have been described. However, the data transfer could originate at the mobile station instead. This transfer could constitute a data request generated by a user operating the handheld device 200. In those circumstances the mobile station's HDML operation recognizes a user input or data request from the mobile station to the Internet protocol and transfers the request to the Enhanced Server. The server then takes the data request and transfers it to the IP network.

In a further enhancement to the data communication system, the Enhanced Server also has the ability of implementing the known wireless IP service. That is, the Enhanced Server can communicate data between the IP network 250 and a handheld device or mobile station which communicates via the CDPD network 260 in a manner similar to that already described above with respect to the prior art. In that embodiment the enhanced server must be able to recognize the network to which the mobile station is presently registered and then must appropriately route the data information from the HTTP network to the mobile station in accordance with the network to which it is registered.

Figure 3:
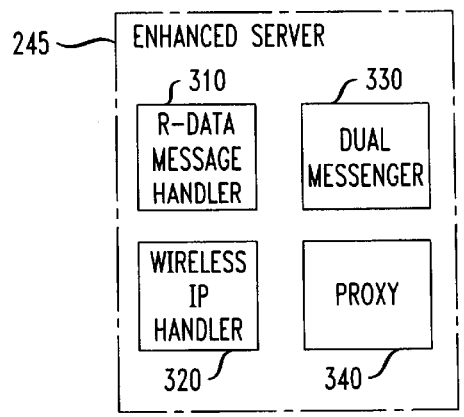
FIG. 3 illustrates a block diagram representation of the enhanced server of the embodiment illustrated in FIG. 2.

A block diagram of an enhanced server for use in the communication configuration of FIG. 2 is illustrated in FIG. 3. In this enhanced server 245 there are at least four basic elements, a proxy 340, a dual messenger 330, a wireless IP handler 320, and an R-Data message handler 310. The dual messenger receives a notification from the data network of a message for the handheld device. The messenger then determines the network to which the hand held device is connected and registered. The messenger, having identified the location of the station then manages the delivery of data via the network to which the station is registered. This is different from known IP handling networks in that dual messenger 330 must first locate the mobile station before sending a message or notification to the mobile station.

The proxy 340 forms the information interface to the IP network. The proxy can request notification information from the dual messenger to obtain the application on the IP network which desires to transfer information. The identity of the application is typically a URL (universal resource locator) that is contained in notification information transmitted to the dual messenger by the application on the IP network. The proxy also then receives the data from the application and then transfers it to the mobile station via either the R-Data message handler 310 or the wireless IP handler 320.

Figure 1A:
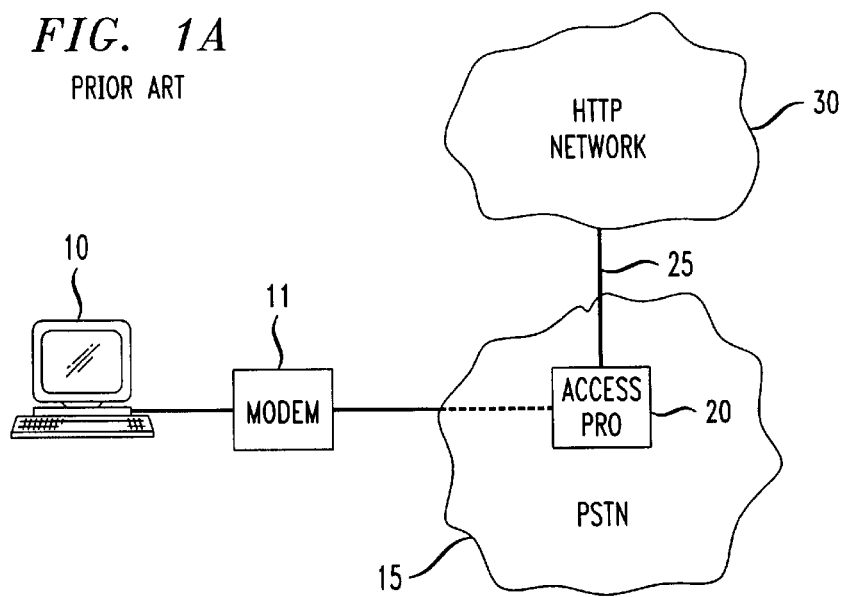
FIGS. 1A and 1B illustrate block diagrams of prior art data communication configurations.

The wireless IP handler operates like the wireless IP interface of the prior art shown in FIG. 1A.

The R-Data message handler has the function of locating the mobile station and delivering message notifications using the R-Data teleservice available over the IS-136 protocol.

An example of the operation of the communication network elements of FIG. 2 and FIG. 3 in the context of data transfer is provided to clarify the understanding of these elements. In this example, application 270 in the IP network desires to send a message to the mobile station 200. The application first posts a notification request to the dual messenger 330. The dual messenger 330 passes the notification request together with an identifier of the mobile station such as the mobile identification number (MIN), to the R-Data message handler 310. The R-Data message handler 310 then generates a query to the teleservice server 240 to determine if the target mobile station is present on the IS-1 36 system. The teleservice server then interrogates a home location register (HLR) associated with the identified target mobile station. (The HLR is not shown in the drawing figures.) It is assumed for this example that the mobile station 200 is registered in the PCS network 230. Therefore, the HLR identifies to the teleservice server 240 that the mobile station 200 is registered on the network. The R-Data message handler then verifies that a paging rate has not been exceeded and requests that the proxy obtain the notification data from the application via the IP network. The proxy 340 obtains from the dual messenger the identifier (in this case URL) of the application and generates a request for the data from the application and transmits that request over the IP network. When the application returns the data to the proxy 340, the proxy delivers that data to the R-Data message handler 310 which in turn, sends the data to the teleservice server and in particular, the message center in that server. The teleservice server in turn delivers the notification and information to a mobile switching center. The MSC then delivers the data to the mobile station 200 via the base station 210 and a wireless communication consistent with the IS-136 protocol. The data is transferred in an R-Data message or messages transferred over the wireless channel. Having described the general operations of the enhanced server and the teleservices server, the following provides a more detailed description of the data transfer operations which are conducted.

The IS-136 protocol permits certain teleservices, generally referred to as over-the-air teleservices, which are additional services involving data transfers over the wireless communication channel. An example of one such teleservice is described in co-pending application Ser. No. 08/728,275 entitled "A Method and Apparatus for Over-the-Air Programming of Telecommunication Services."

Delivery of message notifications and message data to IS-136 mobile stations requires the development of a new IS-136 teleservice. The teleservice proposed is a general UDP transport teleservice (or GUTT). This teleservice transports UDP datagrams (User Datagram Protocol, Request for Comments (RFC) 768, J. Postel) from an application in the IP network to the appropriate application in the mobile station, namely the browser operating in the mobile station. The general UDP transport teleservice is sent over the IS-41 network. In particular, it is sent over in part of a short message service deliver point-to-point (SMDPP) message in that protocol. Specifically, the information is sent in the short message service Bearer Data of such a message. The teleservice server encapsulates the incoming data from the R-Data message handler into the appropriate GUTT format and packages it into an IS-41 SMDPP transport message. The teleservice server then routes this transport message to the mobile switching center (MSC) that serves the mobile station as identified by the information in the mobile station's HLR. The message is transferred to the MSC using standard IS-41C short message service delivery procedures. The MSC then performs the interworking from the IS-41 SMDPP to the IS-136 R-Data over-the-air interface. A more detailed description of the operation of the transport service is now provided in connection with two situations, one where the mobile station is registered in the network and one mobile station at the time of message notification is not registered or not available.

In the circumstance where the station is presently registered in a serving system, the home system of the mobile station includes a home location register which stores information about the location of the mobile switching center that is servicing the station. A dual messenger will receive a notification request from an application and pass the request to the R-Data message handler (RDMH) along with mobile station identifiers such as an electronic serial number (ESN) and/or a mobile identification number (MIN). The RDMH in turn sends a request to the teleservice server specifying the identification of the mobile station and inquiring whether the station is available. The teleservice server (TS) interrogates the HLR which provides a response that the station is available. In that circumstance, the TS advises the RDMH that the station is available. The RDMH then returns a delivery request to the TS that contains the mobile station identifier and the data that is to be delivered to the mobile station. The teleservice server includes a message handler application that receives the delivery request from the RDMH. Once the TS determines that it has valid address information for the identified mobile station the TS packages the data into a GUTT message and encapsulates it into a short message deliver point-to-point (SMDPP) message. The server then sends the SMDPP message to the serving MSC identified by the HLR. The serving MSC receives the SMDPP message and identifies that the request is for a mobile station that it is currently serving. The MSC then sends an IS-136 SPACH notification of R-Data in the SPACH channel. The mobile station receives the SPACH notification and responds with a SPACH confirmation on the reverse channel or RACH. The MSC, upon receipt of confirmation signal encapsulates the GUTT message in an IS-136 R-Data message on the SPACH. The MS receives the R-Data and processes the data. If the data is acceptable the mobile station sends an R-Data accept message. The mobile station then sends the received data to the browser in the mobile station.

It may so happen that at the time that the application in the IP network desires to send information to the mobile station the mobile station is not available for teleservice delivery. At that time then, after the RDMH has requested the availability of the mobile station, the HLR will identify the mobile station as "not available." The HLR will also set a flag to notify the teleservice server when the mobile station becomes available. At some time later, the mobile station registers with a serving MSC. The serving MSC then provides information to the HLR to identify the MSC with which the mobile station is currently registered. The HLR, due to the set flag, then notifies the teleservice server of the availability of the mobile station. The teleservice server in turn notifies the RDMH of the availability of the mobile station. The message transfer operation then continues as described above with respect to a station detected to be available.

Figure 4:
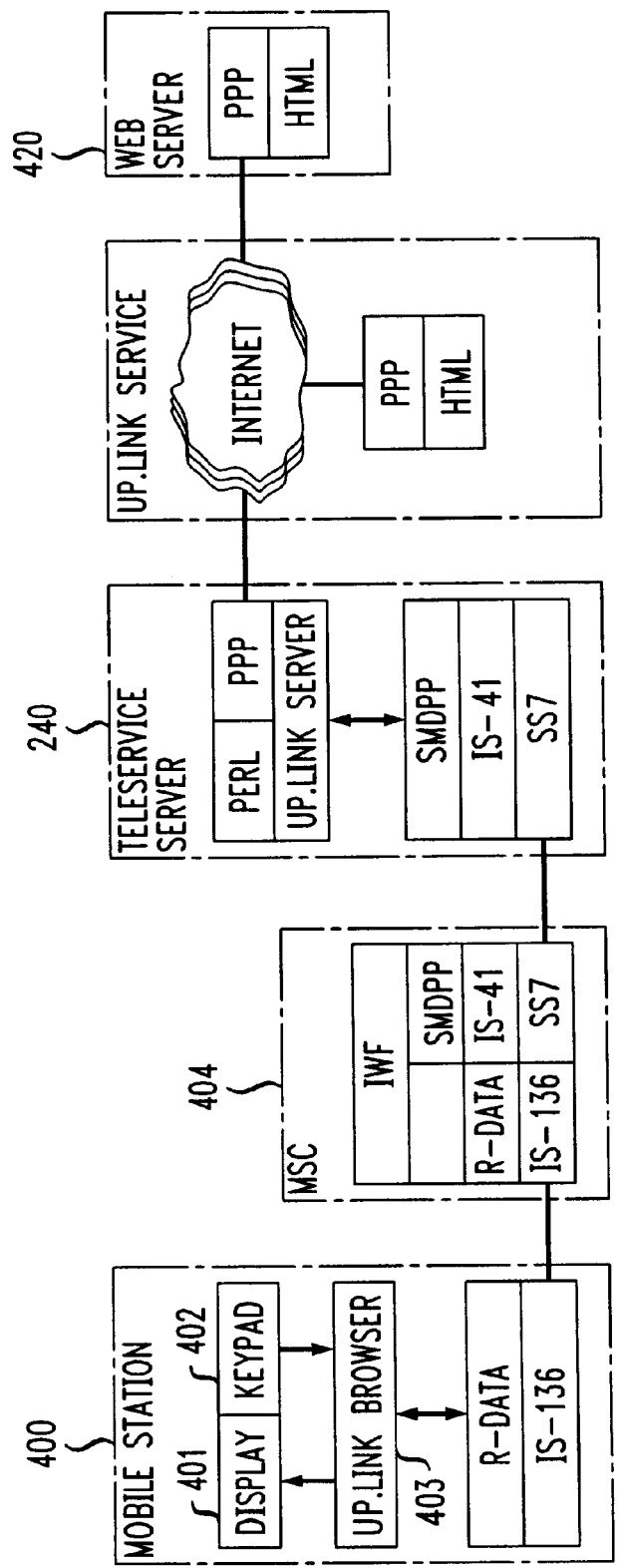
FIG. 4 is another schematic representation of an embodiment of the present invention.

FIG. 4 provides another block diagram representation of an embodiment of the present invention showing protocol levels associated with the respective elements in the data network. The mobile station 400 has a display 401 and a keypad 402 which can interact with a browser capable of operating with the appropriate mark-up language. The browser interfaces with the R-Data messages which are received in the IS-136 protocol with which the mobile station communicates with the PCS network. A mobile switching center (MSC) 404 communicates with the mobile station 400 over the IS-136 protocol and can transfer the R-Data messages within that protocol. The MSC 404 creates the R-Data messages from the short message data point-to-point (SMDPP) messages which it receives over the IS-41 protocol from the teleservice server 240. The teleservice server 240 translates data from a server such as web server 420 from an Internet Protocol (IP) to an SMDPP message that includes the data in a form usable by the mobile station. The server is connected to the Internet and employs the HTML.

Referring back to FIG. 2, the preceding description has focused on the transfer of data or communication of data between the mobile station over the PCS network. However, the enhanced server may recognize or determine that the mobile station is not registered on the PCS network but is instead registered on the CDPD network. In that circumstance, the enhanced server will transfer information from the proxy to the wireless IP handler in the enhanced server (see FIG. 3) and the data can be transferred over the CDPD network to a mobile station registered on that network. Thus, the enhanced server has the capability of recognizing that an addressed or targeted mobile station is registered on one of multiple networks and can appropriately format the IP data so as to transfer the data to the mobile station.

Figure 5:
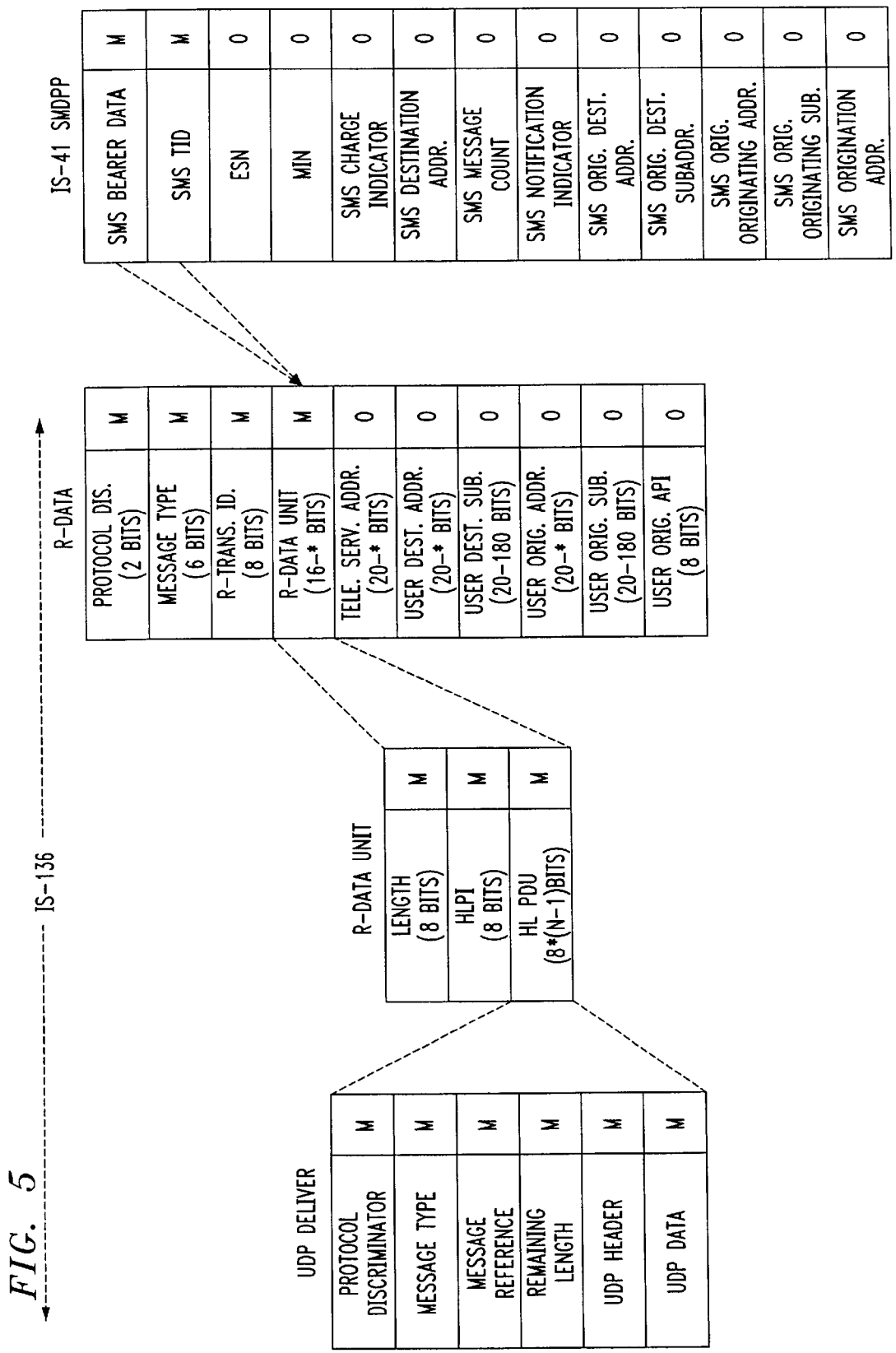
FIG. 5 illustrates a data flow in a transfer of data from a data network to a mobile station in accordance with an embodiment of the present invention.
Figure 6:
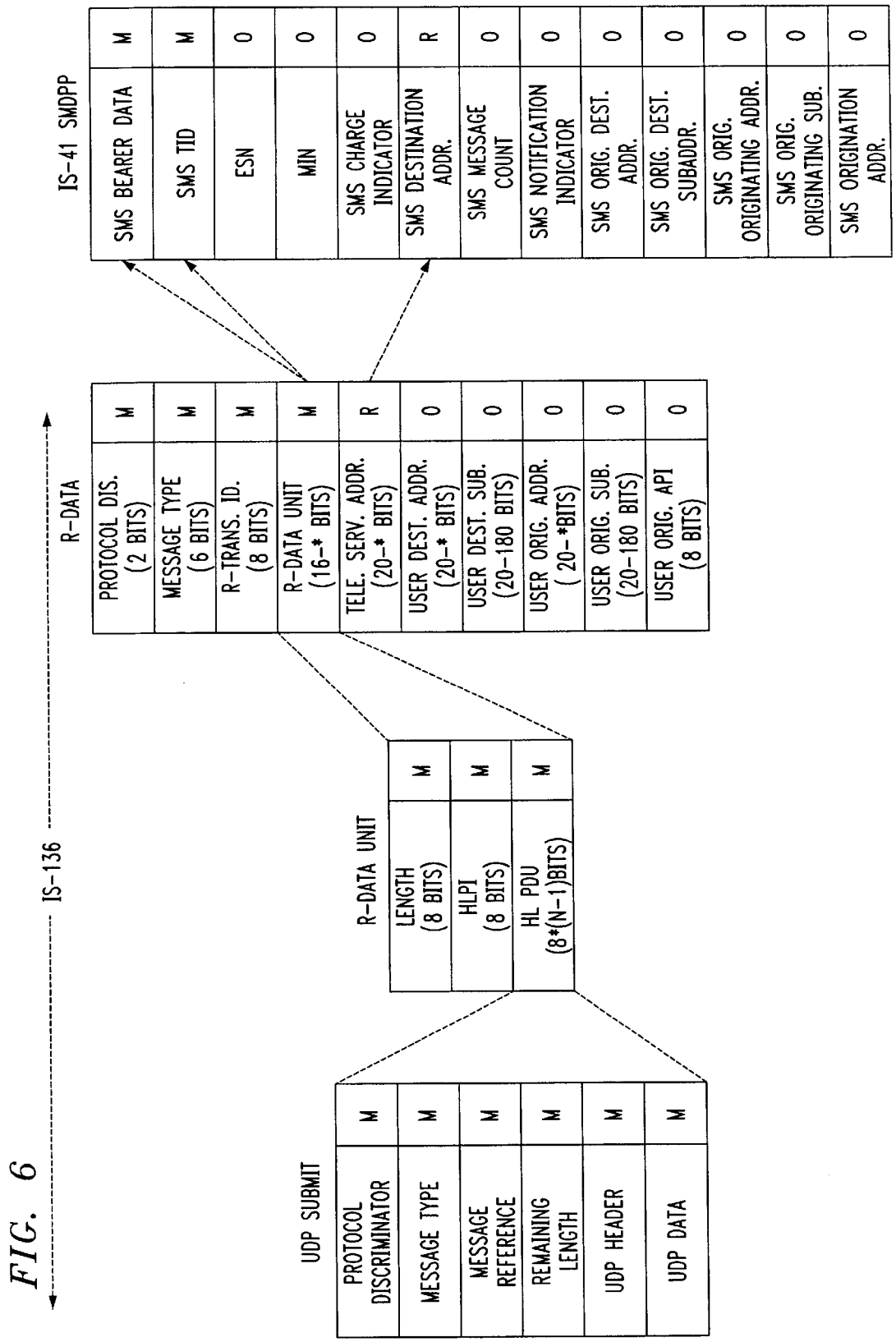
FIG. 6 illustrates a data flow for a transfer of data from a mobile station to an IP network in accordance with an embodiment of the present invention.

FIGS. 5 and 6 relate to implementations of messages in the GUTT teleservice. One message relates to mobile terminated messages and another relates to mobile originated messages.

The first message is a UDP deliver message that is a mobile-terminated message used for delivery of a UDP datagram to a mobile station. The user data in the UDP datagram is binary data, which may have a specific application encoding that is transparent to the teleservice. The format of the UDP deliver message is as follows:

| Information Element | Usage | Length (Bits) | Type |
|---|---|---|---|
| Protocol Discriminator | Identifies the version of the GUTT protocol. | 2 | M |
| Message Type | Specifies the type of message. | 6 | M |
| Message Reference | Reference number assigned by the TS for the teleservice message. | 16 | M |
| Remaining Length | Remaining length of UDP Deliver message following this IE. | 16 | M |
| UDP Header: | | 64 | M |
| Source Port | Source Application Port | | |
| Destination Port | Destination Application Port | | |
| Length | Total octets in UDP header and data | | |
| Checksum | Checksum to validate contents of the UDP message | | |
| User Data | UDP data | 0-* | M |

FIG. 5 illustrates a mapping of the UDP deliver message from R-Data and SMDPP. In the IS-41 protocol the data is placed in the SMS bearer data, SMSTID fields. In the R-Data message in the IS-136 protocol at the mobile switching station this information is placed in the R-Data unit. FIG. 5 shows how the R-Data unit is broken out to include the data portion HL PDU and it is into this portion that the UDP deliver information is inserted. The UDP deliver information includes a description type as well as a UDP header and data which includes the IP data originally transmitted by the IP network.

The second GUTT message is the UDP submit message which is a mobile-originated message used for delivery of a UDP datagram to the network. The user data in the UDP datagram is binary data which may have specific application and coding that is transparent to the teleservice. The format of the UDP submit message is as follows:

| Information Element | Usage | Length (Bits) | Type |
|---|---|---|---|
| Protocol Discriminator | Identifies the version of the GUTT protocol. | 2 | M |
| Message Type | Specifies the type of message. | 6 | M |
| Message Reference | Reference number assigned by the MS for the teleservice message. | 16 | M |
| Remaining Length | Remaining length of UDP Deliver message following this IE | 16 | M |
| UDP Header: | | 64 | M |
| Source Port | Source Application Port | | |
| Destination Port | Destination Application Port | | |
| Length | Total octets in UDP header and data | | |
| Checksum | Checksum to validate contents of the UDP message | | |
| User Data | UDP Data | 0-* | M |

FIG. 6 shows a mapping of the UDP submit message from R-Data and SMDPP. This mapping is something of a reverse representation of the flow of data in FIG. 5 where a datagram is created by the mobile station and placed into an R-Data unit consistent with the IS-136 protocol. This R-Data unit is included in the R-Data transmitted from the mobile station to the mobile switching center over the air. The MSC extracts information from the R-Data to be placed into the appropriate IS-41 SMDPP message format.

Figure 1B:
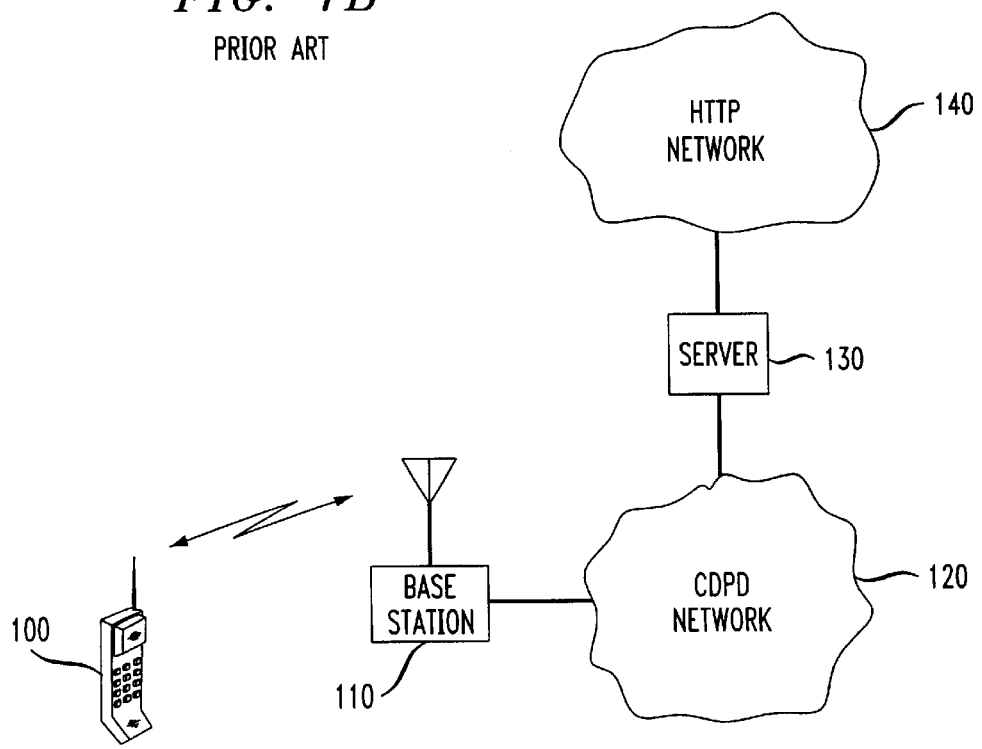

In accordance with the present invention, the mobile station is able to communicate with an IP network without need for an Internet protocol handler. It is able to communicate without having to rely on a dedicated data network such as the CDPD nor does it rely a dedicated data channel for communication. Instead, the present invention provides that data can be transmitted to the mobile station over a teleservice which permits the data to be interleaved with voice information if the mobile station is in a voice mode or simply transferred over a control channel if the mobile station is in an idle mode consistent with the operations of the mobile station in the IS-136 protocol. As a result, the mobile station has more flexibility in its interaction with the IP network. The IP network is able to transfer information to the mobile station under a broader set of circumstances than is available in either of the prior art configurations illustrated in FIGS. 1A and 1B.

While the above embodiment has focused on a translation of data from an Internet protocol network to the IS-136 protocol it should be recognized that the present invention is equally applicable to other exchanges of data between data networks and mobile stations where the data format in the first network is different from the data format in the network to which the mobile station is connected. More specifically, it is possible that the present invention could be applied to provide mobile stations with access to data on wide area networks or intra-nets as opposed to the Internet. Furthermore, the present invention is not specifically limited to the IS-136 protocol, but is applicable in any protocol which permits messaging to the mobile station, especially where such messaging can be interleaved with voice mode operation or can be transmitted over some control channel while the mobile station is in an idle mode.

What is claimed is:

1. A method of locating a mobile station registered on one of a wireless packet data network and a wireless communication network, comprising:

receiving, at a device, a request to transfer Internet Protocol (IP) data from an application to the mobile station, the device capable of being coupled to the wireless packet data network and the wireless communication network;

querying, from the device, the wireless packet data network to locate the mobile station;

querying, from the device, the wireless communication network to locate the mobile station; and locating the mobile station on at least one of the wireless packet data network and the wireless communication network before transferring the IP data to the mobile station.

2. The method of claim 1, wherein the wireless communication network is a network operating under a Time Division Multiple Access (TDMA) protocol.

3. The method of claim 1, wherein the wireless communication network is a network operating under a Code Division Multiple Access (CDMA) protocol.

4. The method of claim 1, wherein the wireless packet data network is a network operating under the Cellular Digital Packet Data (CDPD) protocol.

5. An enhanced server, comprising:

a message handler;

a wireless Internet Protocol (IP) handler;

a proxy; and a dual messenger that, in response to receiving an IP data transfer notification request addressed to a mobile station's IP address, determines if the mobile station is registered on a first wireless network having a first access protocol, and if the mobile station is not registered on the first wireless network, the dual messenger:

associating the mobile station IP address to the mobile station identifier; and transmitting a notification request, identified by the associated mobile station identifier, to the message handler.

6. The enhanced server of claim 5, wherein the proxy forms an interface to an IP network and requests notification information from the dual messenger to obtain an identity of an application on the IP network that transmitted the IP data transfer notification request.

7. The enhanced server of claim 5, wherein the proxy receives data from an application on the IP network that transmitted the IP data transfer notification request and transfers the data to the mobile station via one of the message handler and the wireless IP handler.

8. A machine-readable medium having stored thereon a plurality of executable instructions, the plurality of instructions comprising instructions to:

receive, at a device, a request to transfer Internet Protocol (IP) data from an application to a mobile station, the device capable of being coupled to a wireless packet data network and a wireless communication network;

query, from the device, the wireless packet data network to locate the mobile station;

query, from the device, the wireless communication network to locate the mobile station; and locate the mobile station on at least one of the wireless packet data network and the wireless communication network before transferring the IP data to the mobile station.

* * * * *